United States Patent [19]

Schmanski

[11] E Patent Number: Re. 32,045

[45] Reissued Date of Patent: Dec. 10, 1985

[54] ROADWAY/TRAFFIC DELINEATOR

[76] Inventor: Donald W. Schmanski, P.O. Box 1298, Carson City, Nev. 89701

[21] Appl. No.: 938,241

[22] Filed: Aug. 30, 1978

Related U.S. Patent Documents

Reissue of:

[64] Patent No.: 4,092,081
Issued: May 30, 1978
Appl. No.: 812,643
Filed: Jul. 5, 1977

[51] Int. Cl.[4] ..... E01F 9/00
[52] U.S. Cl. ..... 404/10
[58] Field of Search ..... 404/10; 116/63 R; 40/125 N

[56] References Cited

U.S. PATENT DOCUMENTS

| | | | |
|---|---|---|---|
| 2,030,623 | 2/1936 | Eggleston . | |
| 2,774,323 | 12/1956 | Kirk | 404/10 X |
| 3,212,415 | 10/1965 | Byrd | 404/10 |
| 3,260,010 | 7/1966 | Dubois . | |
| 3,362,305 | 1/1968 | Pellowski | 404/10 |
| 3,371,647 | 3/1968 | Shopbell | 404/10 |
| 3,502,007 | 3/1970 | Anderson | 404/10 |
| 3,646,610 | 2/1972 | Jackson . | |
| 3,709,112 | 1/1973 | Ebinger | 404/10 |
| 3,820,906 | 6/1974 | Katt | 404/10 X |
| 3,853,418 | 12/1974 | Druin . | |
| 3,863,595 | 2/1975 | Barnett | 116/63 R |
| 4,061,435 | 12/1977 | Schmanski et al. | 404/10 |
| 4,076,873 | 2/1978 | Shea . | |
| 4,078,867 | 3/1978 | Ronden . | |
| 4,084,914 | 4/1978 | Humphrey | 404/10 |

FOREIGN PATENT DOCUMENTS

| | | | |
|---|---|---|---|
| 1286060 | 1/1969 | Fed. Rep. of Germany | 404/10 |
| 749652 | 5/1956 | United Kingdom . | |
| 1231285 | 5/1971 | United Kingdom . | |

OTHER PUBLICATIONS

"Fiberglass Reinforced Plastics," Owens Corning Fiberglass, Nov. 1964.
Extren Glass Reinforced Structurals, Eng. Manual, Morrison Molded Fiber Glass Co. (MMFG) 1971.
Pultrusion, Material and Process Technology Review, Owens/Corning Fiberglass Corp. Jul., 1976.
Glossary of Mechanical and Physical Properties, Owens Corning Fiberglass Corp. Jun., 1972.
V-2, Pultrusion and Rod Stock, SPI Handbook, 2nd ed., 1977.
Glastruder Brochure, Goldsworthy Engineering Inc., Pre-1977.
MMFG Brochure Entitled, "Technical Data-Color", undated.
MMFG Brochure, Form 877-3, Entitled, "Extren Fiberglass Reinforced Pultrusions for Const." (no date).
MMFG Booklet, Entitled "Extren, FRP Pultrusions," no date.
Article Entitled "Pultruding Filamentary Composites an Experimental and Analytical Determination of Process Parameters," 1974.
MMFG Brochure, Entitled "Options," Form MMFG 677-2-undated.
"Here's What's Happening in Pultrusion," Plastics Design & Processing Journal, Jan. 1970.
Mark's Mechanical Engineers Handbook, 5th Edition (1951) pp. 437 and 465.

*Primary Examiner*—William F. Pate, III
*Attorney, Agent, or Firm*—Thorpe, North & Western

[57] ABSTRACT

A post designed for sign or guide marker use having sufficient longitudinal rigidity to withstand a force driving it into the ground and sufficient elasticity to permit nondestructive deformation upon impact by a moving object, with subsequent restoration to an original, upright position. Various construction materials *including fiber reinforced plastics*, and/or structural configurations are disclosed for obtaining this dual character without incurring high production and material costs.

21 Claims, 12 Drawing Figures

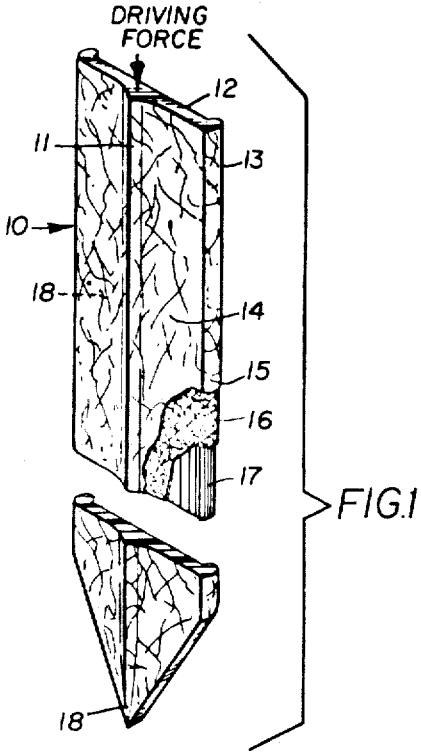
FIG.1
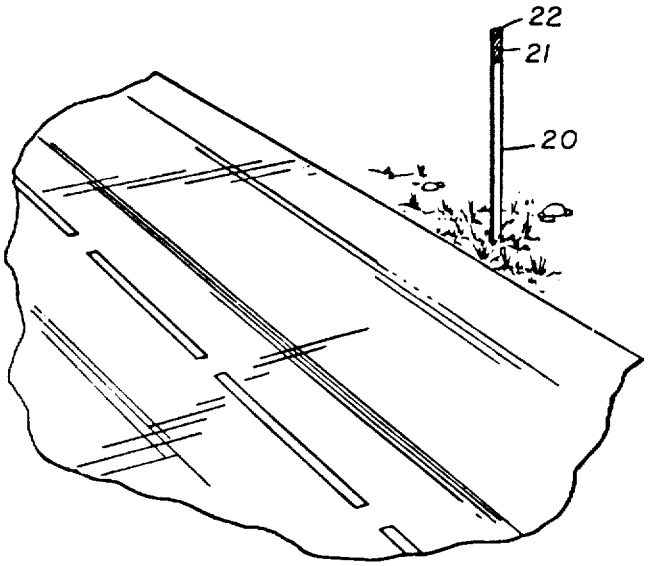
FIG.2
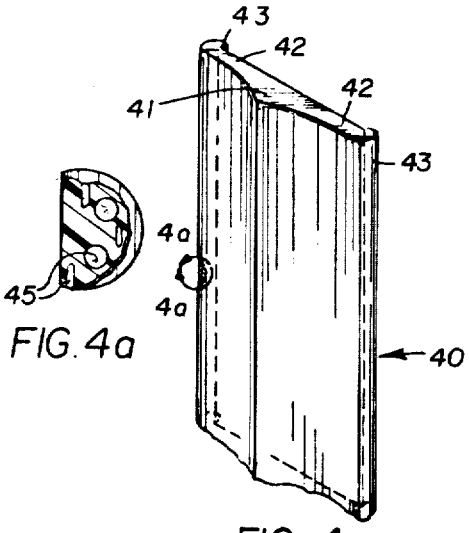
FIG.4a
FIG. 4
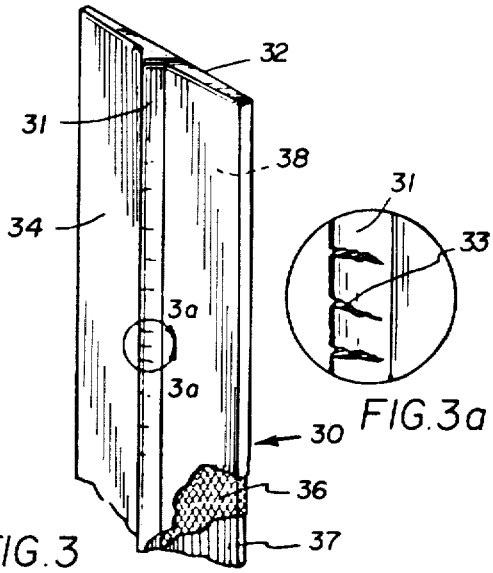
FIG.3a
FIG.3

ROADWAY/TRAFFIC DELINEATOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to roadway markers or guide posts *constructed from fiber reinforced resins*. More particularly, it is concerned with resilient posts which permit nondestructive deformation upon impact by a moving object.

2. Prior Art

Vehicle traffic control requires the use of road signs and markers as aids in solving the various problems associated with traffic safety and direction. It has been found that a useful characteristic for such signs and markers is that these posts have the ability to withstand vehicle impact, without requiring subsequent replacement. An attempt has been made to fill this need with various configurations of posts. However, the structural design of such posts has involved the consideration of two opposing structural features, i.e. the elasticity required during dynamic conditions to permit the post to nondestructively bend with vehicle impact and the longitudinal rigidity required during static conditions to withstand forces resulting as the post is driven into a hard surface.

The elasticity is necessary in view of frequent high speeds associated with impacts between a moving vehicle and stationary post. In such cases, if the post could not bend it would likely shear off, and would have to be replaced. Mere bendability, however, is not sufficient, since each time a post was bent it would have to be straightened before it could again be functional. This could involve high maintenance costs. Ideally, a post should also have sufficient elasticity that it will automatically assume its proper upright configuration after dissipation of any impact forces.

While elasticity is desirable, the elasticity may present a practical problem when installation of the post is considered. In the past, when deformable plastics have been used as post material, installation has frequently required predrilling a hole or insertion of some support receptacle into the ground, with the subsequent positioning of the plastic post into the hole or receptacle. These preliminary steps were required because such previously known elastic posts would not withstand a buckling force applied during attempts to drive the posts into hard surfaces. Consequently, the same elastic properties which permitted the nondestructive deformation upon impact caused the buckling of a post subjected to a driving force along its axis.

Attempts have been made to incorporate the dual requirements of elasticity and rigidity by utilizing a spring within an otherwise rigid post, and with the rigid parts of the post being secured on opposite ends of the spring. Installation was by compressing the spring and then pounding along the now rigid longitudinal axis. After installation, the deformable character of the post was accomplished by the transverse elastic property of the included spring.

This configuration, however, has several apparent disadvantages. The rigid portion of the structure has customarily been made of strong materials which may dent or otherwise damage the impacting vehicle. Furthermore, the use of such rigid materials and springs and the assembly requirements result in excessive costs for the posts.

U.S. Pat. No. 3,875,720 discloses a second approach to the problem, of providing elasticity in a post that can be driven. In this patent a post is formed by a bundle of flexible rods that are clamped together to obtain the desired rigid property required during the static installation stage of the post. Deformation of the post during dynamic conditions is permitted by deflection of the various flexible rods away from the central axis of the post structure. Here again, however, economic factors appear to have impeded utilization of such structure despite the growing need for such a post.

OBJECTS AND SUMMARY OF THE INVENTION

It is therefore an object of the present invention to provide a deformable post configuration having both longitudinal rigidity and bending elasticity to facilitate driving emplacement and subsequent impact without destructive deformation *thereby preserving the original, upright configuration or condition of the post following impact*.

It is a further object of the present invention to obtain this dual character by utilization of a geometrical configuration adapted to minimize bending stress while at the same time retaining the high modulus of elasticity necessary to preserve longitudinal rigidity.

An additional object of the present invention is to accomplish the aforementioned dual character by means of reinforcing a web structure with a suitable arrangement of fibers.

A still further object of this invention is to develop the desired dual character of elasticity and rigidity by incorporating reinforcing rib structure longitudinally along the post structure.

It is yet another object of the present invention to provide a post structure having transverse flexibility to permit lateral contortion and/or deformation to a minimal thickness and thereby reduce moment of inertia and bending stress.

It is also an object of this invention to provide means for protecting attached marker materials from impact and weather degradation.

These and other objects of the present invention are realized in a post configuration (hereinafter referred to as a delineator) wherein the delineator comprises an elongated web and associated reinforcing structure. The web portion of the delineator provides the flexible properties which permit bending of the delineator in response to a bending impact force. The reinforcing structure is necessary to develop a high modulus of elasticity along the longitudinal axis of the delineator. Such reinforcing structure is implemented by specific utilization of fiber orientation within the web structure or by configuring the structure geometrically to provide ribs having the desired high modulus of elasticity which will complement the bending properties of the web structure. Other objects and features will be obvious to a person of ordinary skill in the art from the following detailed description, taken with the accompanying drawings.

DESCRIPTION OF THE DRAWINGS

In the drawings:

FIG. 1 is a fragmentary perspective view of a delineator of the present invention, having a partially cut away section.

FIG. 2 is a perspective view of the delineator in combination with a roadway.

FIG. 3 is a fragmentary, partially cut away view of a second embodiment of the present invention.

FIG. 3a shows an enlarged, fragmentary view taken within the line 3a—3a of FIG. 3.

FIG. 4 depicts a fragmentary perspective view of an additional embodiment of the present invention.

FIG. 4a shows an enlarged, fragmentary view taken within line 4a—4a of FIG. 4.

DETAILED DESCRIPTION OF THE INVENTION

Figure 5:
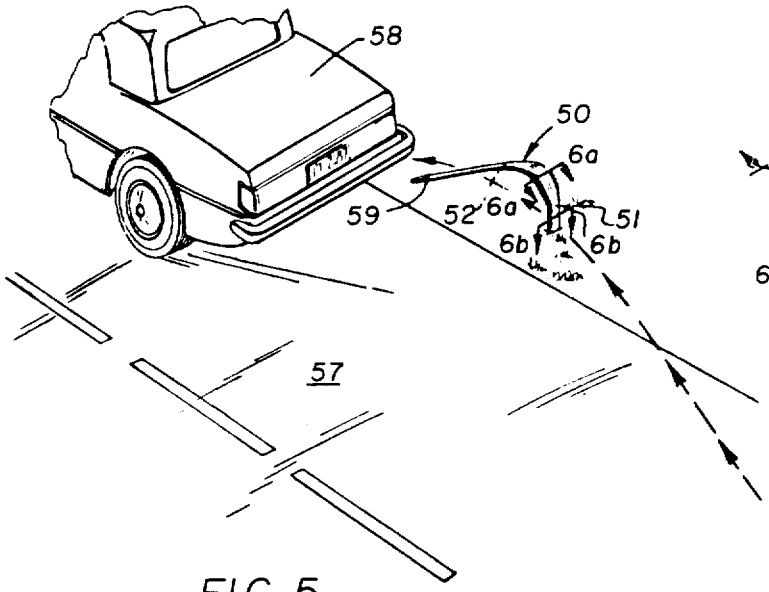
FIG. 5 is a perspective view of a delineator immediately after impact with a moving object.

Referring now to the drawings:

The present invention relates to the establishment of proper elastic and rigid mechanical properties within a delineator structure. The normal use of such a roadway delineator entails two separate forms of stress application. Initially, the delineator is subjected to installation stress as the delineator is driven into a hard surface, such as ground. Typically, this driving force is applied to the top end of the delineator and therefore represents a longitudinal force extending down the length of the delineator. It is noted that this stress arises when the delineator is in a static state - i.e., when no bending forces are being applied. The required mechanical properties necessary to avoid buckling of the delineator under the applied driving load, are represented in the following formula:

$$P_E=(\pi^2 EI)/L^2$$

Where:

E = elastic modulus in compression

I = moment of inertia

L = length of the column $P_E$ = maximum buckling load

Once the length L of the delineator is established the product of EI becomes determinative of the ultimate buckling load the post can withstand.

A second form of stress anticipated for the delineator is the bending stress applied upon impact by a moving object with a surface of the delineator. This form of stress, arising during dynamic conditions, is represented by the following relationship:

$$f_b=MC/I$$

Where:

$f_b$ = bending stress

M = bending moment

C = distance from neutral axis to point of stress.

Bending moment M is defined by the expression:

$$M=EI/R$$

Where:

E = elastic modulus

I = moment of inertia

R = radius of curvature

In dealing with both forms of stress, therefore, it is imperative that the proper relationship be established between the elastic modulus E and the moment of inertia I.

From the equations defining the respective forms of stress applied to the delineator, it is apparent that rigid posts, such as those made of metal or wood, have a very high buckling load factor, $P_E$. With such materials both E and I may have very large values. This factor is favorable during installation, but may be catastrophic upon vehicle impact.

This adverse condition is apparent from equation (3), which may be rewritten in the form R = EI/M. In this case, it is apparent that the large product of EI from the previous buckling formula (1) would result in a large radius of curvature R which is clearly adverse to applications for delineators to be subject to impact deformation. Customarily, such impact will usually involve a motor vehicle whose structure will require the delineator to deform to a radius of a curvature of approximately 18 inches. Where the product of EI is high and the point of impact is approximately 18 inches above ground level (making M quite low in value) the resultant radius of curvature is far too large and the motor vehicle may simply shear off the delineator between the point of impact and ground level.

An important aspect of the present invention is the recognition that, under typical uses of a delineator, the value of EI in the static condition during installation will not satisfy the bending requirements experienced during impact at a lateral surface. Inherent properties within the delineator are required which will develop a lower EI product during dynamic bending. Simply stated, the most versatile delineator must respond to a driving load with a high EI product to preclude buckling, but must experience a lower EI during bending subsequent to impact.

The present invention involves unique structural design to establish a proper balance between E, the elastic modulus and I, the moment of inertia. Whereas large values of E are required to maintain the necessary rigidity to withstand the longitudinal driving force arising during static conditions of installation, I is of minimal value to improve the bending ability of the delineator to achive a low radius of curvature. The delineator of the present invention provides a variable EI response to the respective loading and bending stresses, to satisfy both static and dynamic conditions in a single embodiment.

FIG. 1 illustrates one embodiment of the delineator utilizing concepts of the subject invention, wherein the appropriate balance between E and I is obtained by a combination of geometrical structure and material composition. The delineator, shown generally as 10, is constructed of a plastic binder with reinforcing fibers. The plastic binder may be any suitable plastic which is capable of withstanding the variations of temperature to which it will be subjected and which possesses the desired elongation characteristics to prevent massive fracturing upon impact.

Thermosetting resin material is particularly well suited for this application inasmuch as it is not dependent upon temperature to maintain its flexibility. To the contrary, many thermoplastic materials become too brittle when exposed to subfreezing temperatures and result in massive fractures upon impact with a moving vehicle. Where the thermoplastic resin is capable of withstanding temperature variation without concurrent hardening, however, such material may well be suited as binder material for the subject invention.

In order to establish the necessary rigidity to the delineator body 10, reinforcing fiber is embedded within the binder material. A portion 17 of this fiber is positioned longitudinally along the length of the delineator structure. For extra longitudinal strength, a high modulus fiber such as "KEVLAR" may be used. A second layer 16 of fiber material is oriented in random direction to establish tensile stength and to contribute to the proper balance between rigidity and flexibility. A surface coating 15 is utilized to protect the contained binder/fiber combination from weather, ultraviolet rays, and other adverse effects of the environment. In addition to the suggested form of FIG. 1, the arrangement of longitudinal versus random fibers within the structure may be varied such that the random fiber may form a core, with the longitudinal fiber comprising the second layer thereon.

It has been determined that at least seven percent by weight but no more than sixty percent of the fiber arrangement be in random orientation. The remaining amount of fiber is longitudinally oriented to establish the rigidity required for driving the delineator into the ground. Furthermore, although random fiber orientation is described and is shown in FIG. 1, similar transverse flexibility and tensile strength properties can be established where fiber orientation is directed at various predetermined transverse angles of orientation, such as is best shown at 36 in FIG. 3.

It has also been found that where the binder material comprises twenty to forty percent by weight of the delineator structure, use of more than sixty percent random fiber adversely affects the elastic character which is required to restore the delineator to its original *upright* position *and condition* after impact. Also, failure to use at least forty percent of the fiber in the longitudinal orientation, without other reinforcing structure, will result in insufficient resilience or elastic modulus to permit the delineator to be driven into the ground. This use of proper amounts of fiber coordinated between transverse and longitudinal orientations, represents an effective method of establishing the appropriate E and I within the delineator structure.

A second method for establishing sufficient elastic modulus while preserving resistance to a buckling load is accomplished through geometrical configurations such as shown for [examples] *example* by the rib structures 11 and 13 in FIG. 1. In utilizing reinforcing ribs to obtain the higher elastic modulus desired, it is important that such rib structure not extend a substantial distance away from delineator surfaces 14 and 18, since bending stresses arising therein during curvature of the delineator will result in longitudinal shearing along the junction of the rib and web portion 12 of the delineator body. The effect of slightly protruding rib structure, however, is to extend the apparent thickness of the delineator and thereby increase the moment of inertia I, without subjecting the rib structure to excessive stress during the dynamic bending phase. By reinforcing such rib structures 11 and 13 with longitudinal fiber, 17, the elastic modulus E is also increased resulting in even greater rigidity, without increasing rib thickness.

Figure 7:
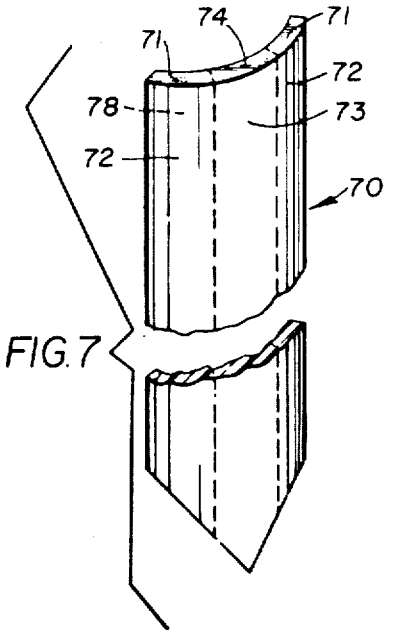
FIG. 7 shows a fragmentary view of an additional embodiment of the present invention.

In circumstances where less buckling stress is anticipated with respect to installation of delineator, rib structure may be omitted and both E and I can be satisfied by the use of proper orientations of reinforcing fibers in combination with a nonplanar (i.e., concave) web structure such as is illustrated by the delineator structure 70 in FIG. 7. Such a slightly concave delineator body, reinforced with longitudinal fibers, can withstand a limited driving load imposed at the top thereof while retaining sufficient flexibility to bend without destructive deformation *and restore to its original, upright condition.*

A second configuration is illustrated in FIGS. 3 and 3a, in which a single rib 31 supplys the reinforcing strength to permit driving of the delineator into the hard surface. In this case, the reinforcing rib 31 is located on a nonimpacting surface 34 of the delineator 30. The thickness of the web portion 32 will depend upon the anticipated impact force associated with the delineator environment. As with previous examples, the full web with reinforcing rib structure may be fully reinforced with the appropriate combination of transverse and longitudinal fibers 36 and 37.

With the single reinforcing rib 31, a somewhat larger rib thickness might be desired to increase moment of inertia and longitudinal rigidity. Although this larger rib size will improve drivability, excessive size will reduce the desired flexibility required for withstanding bending stress. This reduction in flexibility may be partially alleviated by reducing longitudinal fiber content in the rib body and slightly increasing the transverse fiber arrangement to develop a minor fracture capability upon the initial impact of a bending force with the delineator. With this characteristic construction the delineator, prior to bending impact, has increased longitudinal rigidity to withstand the anticipated driving force to be applied during installation. After installation, however, a reduction of moment of inertia and improved flexibility to withstand bending stress is achieved upon an initial impact which develops transverse fractures 33 along the rib length.

When such impact occurs at the front surface 38, the delineator structure curves rearward, causing compression on the back surface 34 and reinforcing rib 31. Because of the shorter radius of curvature imposed upon rib 31, increased compression occurs longitudinally along the rib structure and with the reduced longitudinal fiber, minor transverse fracturing occurs 33. Total shearing or destruction of rib 31 is avoided by means of sufficient longitudinal and random fiber content within the rib portion, with random fiber arrangements being interconnected and intermingling with the attached web structure. The end result, therefore, is a rib reinforcement having small, multiple transverse cracks along its length to facilitate subsequent compliance to bending stress. At the same time, however, some stabilizing influence remains by reason of some surviving continuity of the rib structure.

An additional method of developing high EI for drivability, but lower EI during bending movements is to incorporate a network of microspherical voids within the delineator structure. This concept is illustrated in FIG. 4a. Such voids 45 can be introduced during fabrication by conventional techniques and will operate to lower the moment of inertia and thereby enhance flexibility. Furthermore, although longitudinal rigidity will be retained due to static strength inherent in this configuration, a violent lateral impact will cause the microspheres to partially collapse and operate as tiny hinges to facilitate bending movement.

As shown best in FIG. 4, other geometrical configurations can be used to establish a balance between E and I. The particular configuration shown in FIG. 4 utilizes structural thickness to develop the increased elastic modulus required to obtain drivability for the delineator 40. By utilizing rib structures 43 at the edges of the web structure 42 and a thicker central portion of web structure 41, an increased effective thickness is obtained to satisfy ultimate buckling load requirements. Such effective thickness extends from the front contacting edges of the forward extending ribs 43 through the rearward ridge of the central reinforcing rib 41.

This effective thickness, of course, represents the static condition of the structure of the delineator. On impact, bending forces cause the contortion of the outer ridges 43 in angular rearward movement. This structural deformation facilitates improved bending because of the concurrent reduction of apparent thickness of the delineator body and moment of inertia. Such structure directly implements the concept of variable EI product in response to static and dynamic conditions. In FIG. 5, the deformed delineator 50 is shown immediately after impact with an automobile 58. The elastic forces of the delineator are in the process of restoring the upper portion 59 of the delineator to its original upright position *and condition*. FIG. 6b illustrates the unflexed, apparent thickness of the delineator viewed at the cross section view taken along line 6b. Here the hard ground structure forces the delineator to retain its static configuration, having an apparent thickness extending from i to iv. It is this extended thickness d, which strengthens longitudinal rigidity in the otherwise thinned web structure between ii and iii, and provides the higher EI for this condition.

Figure 6A:
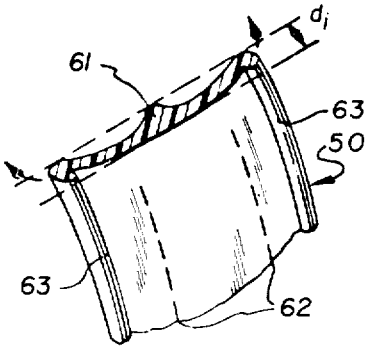
FIG. 6a is a horizontal cross-section view, taken on the line 6a of FIG. 5.
Figure 6B:
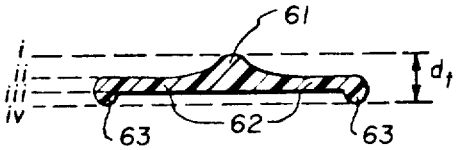
FIG. 6b is a horizontal cross-section view, taken along the line 6b of FIG. 5.

Such configuration is modified, however, during contortions illustrated in FIG. 5, as represented in the FIG. 6a view. The thinner structure of the web body 62 permits greater flexibility and causes rotation of the more massive ridge members 63 in angular rotation rearward. The effect of such contortion is to reduce the thickness of the delineator from its static thickness of $d_f$ in FIG. 6b to a reduced thickness $d_i$ of FIG. 6a. The relationship defined by Equation (2).

$$f_b = MC/I$$

shows that any reduction in thickness causes a decrease in the value of C, the distance from the neutral axis to the point of stress. This factor assists in satisfying the requirement for reduced moment of inertia, or increased flexibility, to avoid destructive deformation of the delineator. This characteristic of lateral angular contortion is developed where reinforcing rib structure, having less flexibility than the attached web structure in the transverse direction, is subjected to such a bending impact force.

In addition to the application of this principle to planar type web structures such as illustrated in FIGS. 1, 2, 3, 4 and 5, nonplanar web structures are likewise adaptable to a proper balance of rigidity and elasticity. FIG. 7 illustrates one such embodiment, having lateral edges 72 that are comprised of thermosetting resins which may be reinforced with appropriate fibers in the transverse and longitudinal directions and a central portion 73 containing a longitudinal section of thermoplastic material 74 having greater flexibility than the attached thermosetting material section. As with the prior example, impact at a frontal surface 78 causes rearward angular contortion at the lateral edges 72 which effectively reduces the overall thickness of the delineator, thereby improving its bendable character. The elastic properties of both materials operate to restore the concave structure upon removal of the impacting force. With the combination of concave structure for improved longitudinal rigidity and the improved transverse flexibility of the central section 73, this configuration is also satisfactory insofar as both elasticity and rigidity are concerned.

A common feature of each embodiment described is that a unibody construction exists which incorporates the intermingling of fibers or other supporting rib structure with a web portion having a more flexible character. During installation procedures the higher EI is realized in the reinforced sections of the delineator which operate as the primary load bearing element. Such occurs, for example, at the central ridges, distal ribs, or any areas of greater thickness. During bending contortions following impact, however, the primary load bearing element becomes the more flexible web portion of the structure which provides a reduced moment of inertia and therefore a reduced stress due to the decreased distance between the neutral axis and the various points of stress along the delineator body.

It will be apparent, therefore, to one of ordinary skill in the art that other configurations incorporating various geometries and forms of reinforcing structure can be utilized to implement the inventive concept disclosed herein.

Figure 8:
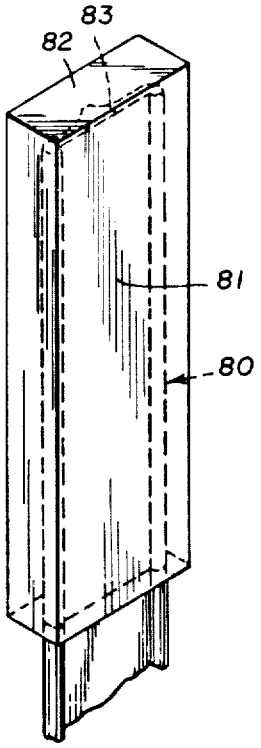
FIG. 8 shows a fragmentary view of a delineator enclosed by a rigid-body casing, shown in perspective.

As best shown in FIG. 8 a removable, rigid-body casing 81 may be positioned around a portion of the delineator structure 80. The effect of this rigid-body casing is to reduce the length of the delineator exposed to buckling forces during installation procedures. This reduced length decreases the denominator of equation (1), thereby increasing the ultimate buckling load. It is noted that since the length parameter of the referenced equation is squared, any reduction in length greatly magnifies the increase in buckling load capable of being withstood.

Typical construction materials used for the rigid body casing 81 would be steel or other heavy-duty substances capable of withstanding buckling pressures exerted by the delineator contained within the casing. Additionally, the casing may be capped with an impactable substance which serves to disperse the driving force along the top edge 83 of the delineator body 80. By utilizing such a rigid-body casing, the strength of the reinforcing rib material required for installation is reduced.

Naturally, the preferred structure for the rigid casing would have the inner surface conformed to the outer surface of the delineator body to be enclosed. This would restrain any lateral movement and essentially eliminate that enclosed section from the total length of the delineator subject to equation (1).

The reinforcing rib structure located at the contacting face of the various delineators illustrated herein may also provide protection for sign materials affixed to the delineator face. As disclosed in FIG. 2, the sign material 21 will generally always be attached at the impacting surface of the delineator 20. Without protective ridging, the sign surface would be exposed to scraping or other destructive forces as it contacts the underside of cars or other impacting objects. The lateral ridges protruding forward from the contacting surface minimize contact with the actual sign surface attached thereto. Such protection is especially important with less durable sign surfaces such as reflective tape.

In connection with the affixation of sign surfaces to the subject delineators, environmental protection against weathering effects must also be considered. Mere attachment of reflective tape, for example, may have limited life expectancy, particularly where the local environment includes rain with freezing weather.

As a practical matter, water may locate behind the reflector covering, and upon freezing, dislodge the material from the delineator surface. For this reason, a small notch is located along a top edge 22 of the delineator surface. The top edge of the tape is then recessed into the notch and protected from the weathering conditions which would otherwise tend to detach the material.

Figure 9:
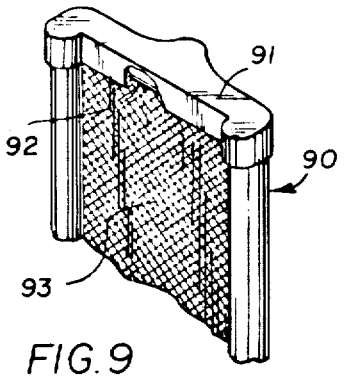
FIG. 9 depicts a protective cap for use with the subject delineator.

An additional means of protecting the top reflector edge is to use a protective cap 91 as shown in FIG. 9. The top edge 92 of the reflective surface 93 is retained within the enclosed region of the cap structure. In this configuration, exposure to rain, snow and other adverse weathering elements are minimized and reflector utility is preserved.

A supplemental benefit of the capped configuration is the protection given to the top edge of the delineator during impact with vehicles. During this impacting contact, the delineator will strike the underside of the vehicle numerous times in attempting to restore itself upright. After repeated occurrences, the top edge of the delineator will tend to fray or otherwise degrade. By using a thermoplastic cap having impact resilience and resistance to ultraviolet radiation, the top edge is protected from such abrasion. Typically, such a cap is fitted after placement of the delineator 90 into the ground, since the installation driving force is preferably applied to the rigid top edge of the delineator body.

Although the preferred forms of the invention have been herein described, it is to be understood that the present disclosure is by way of example and that variations are possible without departing from the scope of hereinafter claimed subject matter.

I claim:

[1. A delineator having concurrent characteristics of a sufficiently high modulus of elasticity for withstanding buckling loads applied during static conditions along its longitudinal axis during installation and a sufficiently low moment of inertia to establish elastic character in an exposed section of said delineator to permit nondestructive deformation upon impact by a moving object and subsequent immediate restoration to an original, upright orientation, said delineator including:

an elongate web structure comprising a combination of random and longitudinally oriented fibers imbedded in 20 to 40% (w) resin binder, said fiber combination being comprised of at least 7% but not more than 60% fiber in random arrangement to provide transverse flexibility and tensile strength, and said longitudinal orientation of fiber comprising the remaining percentage of total fiber content to provide longitudinal rigidity during said static conditions.]

[2. A delineator as defined in claim 1, wherein said resin is selected from the group consisting of thermosetting resins, thermoplastic resins having a modulus of elasticity within a range approximating a modulus of elasticity for said thermosetting resins and thermosetting/thermoplastic resin combinations having an overall modulus of elasticity approximating said thermosetting resin modulus.]

[3. A delineator as defined in claim 1, further comprising a reinforcing longitudinal rib for improving resilience to said buckling loads, thereby increasing said modulus of elasticity to enhance drivability, said reinforcing rib having unibody construction with said web, the combination of web with longitudinal rib having at least 7% by weight of intermingled, random fiber orientation to preclude longitudinal shearing of said rib during said impact.]

[4. A delineator as defined in claim 3, wherein said rib is located along a nonimpacting surface of said delineator and is adapted by suitable imbedded fiber arrangement to develop small transverse fractures along a length of said rib during bending impact, said fractures being operable to improve said elastic character by reducing said moment of inertia.]

[5. A delineator as defined in claim 3, wherein said reinforcing rib is located along an impacting surface of said web to protect an exposed sign configuration affixed to said impacting surface during object contact with said delineator.]

[6. A Delineator as defined in claim 1, wherein said web structure is laterally contoured by varying web thickness and relative nonplanar web structure to increase moment of inertia and rigidity along said longitudinal axis.]

[7. A delineator as defined in claim 1, further comprising one or more longitudinal rib sections protruding from a surface of said web for permitting reduced thickness of nonribbed web sections with concurrent reduction of said moment of inertia, said rib sections being operable to maintain said longitudinal rigidity.]

[8. A delineator as defined in claim 1, further comprising a reflective surface affixed to a surface of said web surface.]

[9. A delineator as defined in claim 8, wherein said reflective surface comprises reflective tape, said delineator further comprising a transverse notch indenting from said affixed surface at a top edge of said tape for providing a recessed point of attachment for said top edge to minimize weathering effects on said tape.]

[10. A delineator as defined in claim 1, further comprising a protective cap positioned over a top edge of said delineator for protecting said edge from destructive contact with said object during impact.]

[11. A delineator as defined in claim 10, wherein said cap is adapted to receive and retain a top edge of an attached sign configuration to minimize weathering effects thereon.]

[12. A delineator as defined in claim 1, further comprising a removable rigid-body casing for enclosing a portion of said delineator during installation, said casing having sufficient inner surface conformity with said delineator to restrain bending movement of said portion when said driving load is applied.]

[13. A delineator as defined in claim 12, wherein said casing further comprises a impactable cap for receiving said driving force and for retaining said casing at an upper portion of said delineator.]

[14. A delineator as defined in claim 1, wherein said web structure is laterally contoured with varying web thickness and relative nonplanar web structure to increase moment of inertia and rigidity along said longitudinal axis, said delineator comprising:

a nonplanar web including a first longitudinal section of thermosetting resin attached to a second longitudinal section of thermoplastic resin, said first section providing higher elastic modulus for drivability and said second section providing a low moment of inertia and improved transverse flexibility to obtain lateral angular contortion of said delineator during bending to cause a reduction in moment of inertia.]

[15. A delineator as defined in claim 14, wherein said nonplanar web is concave in structure having lateral longitudinal sections of thermosetting resin and a central longitudinal section of thermoplastic resin.]

[16. A delineator as defined in claim 1, further comprising a network of microspherical voids within said web structure to reduce moment of inertia and provide differentiating response to a static, longitudinal load and a dynamic bending force.]

[17. A delineator as defined in claim 1, wherein said web structure is concavo-convex at the forward and rearward faces thereof.]

[18. A delineator as defined in claim 17, further comprising longitudinal rib structure at side edges of said web structure, said rib structure adding additional longitudinal rigidity to withstand said buckling loads occurring during installation of said delineator.]

[19. A delineator having concurrent characteristics of a sufficiently high modulus of elasticity for withstanding buckling loads applied during static conditions along its longitudinal axis during installation and a sufficiently low moment of inertia to establish elastic character in an exposed section of said delineator to permit nondestructive deformation upon impact by a moving object and subsequent immediate restoration to an original, upright orientation, said delineator including:

an elongate web structure comprising a combination of traversing and longitudinally oriented fibers imbedded in 20 to 40% (w) resin binder, said fiber combination being comprised of at least 7% but not more than 60% fiber in traversing arrangement to provide transverse flexibility and tensile strength, and said longitudinal orientation of fiber comprising the remaining percentage of total fiber content to provide longitudinal rigidity during said static conditions.]

20. [A] *An elongate* delineator including:

a web structure of unibody construction having a tapered base to facilitate insertion thereof into a hard surface and being constructed of a material composition substantially uniform along the length of said delineator *and including fiber reinforced plastic* which develops a modulus of elasticity (E) sufficiently high, when taken in combination with the moment of inertia (I) of said web structure, to [develop] *withstand a longitudinal impact force having values up to* a maximum buckling load ($P_E$) in accordance with a delineator length parameter (L) as defined by the relation $P_E=(\pi^2EI)/L^2$, [ wherein the resulting buckling load ($P_e$) is capable of withstanding an impact force to be ] *said impact force being* applied near the top of a longitudinal axis of said delineator during static installation conditions at said hard surface;

said *web structure* product of EI being variable in response to *nondestructive* deformation of said delineator by a lateral impact force which modifies [said] geometric structure *of said delineator web structure* to decrease the moment of inertia (I) and develop a delineator bending radius (R) as defined by the relationship $R=EI/M$, wherein M is the bending moment of said delineator, said bending radius being sufficiently low to permit passage of a vehicle over said delineator, said material composition having sufficient elasticity to restore *said delineator* to its upright orientation upon dissipation of said impact force;

said *web* geometric structure comprising a nonplanar impacting surface [of said web structure] which responds with angular contortion upon occurrence of said *lateral* impact, thereby decreasing the moment of inertia of said delineator during bending motion, reducing said EI product from a [longitudinal] *longitudinally* rigid structure to a flexible structure during deformation.

[21. A delineator as defined in claim 20, wherein said material composition includes material selected from the group consisting of thermosetting resins, thermoplastic resins and combinations thereof.]

[22. A delineator as defined in claim 20, wherein said web structure comprises a planar section with at least one longitudinal rib extending forward therefrom.]

[23. A delineator as defined in claim 22, wherein said web structure includes two longitudinal ribs extending forward from the respective sides of said delineator, with a third longitudinal rib extending rearward from a central area of a backside of said delineator.]

[24. A delineator as defined in claim 20, wherein the web structure comprises a concavo-convex structure for the front and backside of said delineator.]

[25. A delineator as defined in claim 24, further comprising a longitudinal rib to increase longitudinal rigidity.]

[26. A delineator as defined in claim 24, wherein longitudinal ribs extend from sides of said concavo-convex web structure.]

*27. An upright delineator of an impact-resistant, elongate web structure consisting of fiber-reinforced synthetic material for driving into hard ground, characterized in that said structure has concurrent driveability and flexibility characteristics wherein the product of EI (E=elastic modulus; I=moment of inertia) for the delineator is chosen such that it withstands buckling loads supplied at the delineator top during installation and that it establishes elastic character in an exposed section of said delineator to permit non-destructive deformation upon impact to permit passage of a moving vehicle over said delineator and subsequent immediate restoration to an original, upright condition, said elongate web structure comprising a combination of random or transversing and longitudinally oriented fibers embedded in 20 to 40 percent (w) resin binders, said fiber combination being comprised of at least 7 percent, but not more than 60 percent, fiber in random or transversing arrangement to increase tensile strength thereby to enable transverse flexibility, and said longitudinal orientation of fiber comprising the remaining percentage of total fiber content to provide longitudinal rigidity during said static conditions.*

*28. A delineator as defined in claim 27, wherein the selected value of E within the EI product is large to withstand the buckling loads applied along the longitudinal axis, and the selected value of I within the EI product is minimal to improve the bendability of the delineator to achieve a low radius of curvature.*

*29. A delineator as defined in claim 27 which is geometrically configured to develop a reversibly variable product of EI by causing a change in the value of I from its value in a static condition to a lower value under dynamic bending conditions such as occur upon lateral impact of the delineator by a moving object, the original value of I being restored following dissipation of impact energy and return of the delineator to its static condition.*

*30. A delineator as defined in claim 27, wherein said web structure is concavo-convex at the forward and rearward faces thereof.*

*31. A delineator as defined in claim 30, further comprising longitudinal rib structure at side edges of said web structure, said rib structure adding additional longitudinal rigidity to withstand said buckling loads occurring during installation of said delineator.*

*32. A delineator as defined in claim 27, wherein the web structure includes a planar surface extending along its full length and adapted for installation toward the direction of oncoming traffic along roadside, a said web structure including rib structure formed integrally therewith at each side and protruding slightly forward of the planar surface to extend the thickness of the web structure and thereby increase the moment of inertia for greater longitudinal rigidity needed to withstand driving forces applied during installation of the delineator, the increased thickness being limited to slight protrusion to avoid excessive stress resulting in longitudinal shearing which would otherwise occur during dynamic bending if the extent of protrusion were too great, said rib structure including longitudinal reinforcing fibers to further increase the elastic modulus of the web structure for withstanding a greater driving force applied at the top of the delineator.*

*33. A delineator as defined in claim 32, wherein the product of EI within the delineator rib structure provides the primary load bearing structure required to withstand impacts applied along the length of the delineator at its top during installation; the thinner, more flexible web being the primary load bearing element responsive to stress forces arising during bending contortions occurring upon lateral impact.*

*34. A delineator as defined in claim 32, wherein EI of the rib structure during dynamic bending requires the delineator to deform in accordance with a radius of curvature (R) defined by the relationship $R=EI/M$ wherein M is the bending moment applied to the delineator during impact by a vehicle.*

*35. A delineator as defined in claim 34, wherein the radius of curvature is approximately equal to or less than the distance from ground level to the lowest part of the underside of a motor vehicle for which impact is anticipated.*

*36. A delineator as defined in a claim 35, where the radius of curvature is approximatley 18 inches or less.*

*37. A delineator as defined in claim 36, wherein the large values of E are achieved by the incorporation of reinforcing, longitudinal fibers along the length of the delineator, the random or transverse fiber being incorporated within the delineator to establish tensile strength and to contribute to the proper balance between rigidity and flexibility.*

*38. A delineator as defined in claim 32, wherein the web and rib structure are geometrically configured to develop a reversibly variable product of EI by causing a change in the value of I from its value in a static condition to a lower value under dynamic bending conditions such as occur upon lateral impact of the delineator by a moving object, the original value of I being restored following dissipation of impact energy and return of the delineator to its static condition, lateral contortion being developed because of the greater flexibility of the thinner web section as compared to the more rigid ribs.*

*39. A delineator as defined in claim 38, wherein the reversible change in the value of I results from the combined rib structure and thinner, planar web which are further adapted to deform upon impact by lateral, angular contortion about the longitudinal axis of the delineator toward its neutral axis in a rearward direction, decreasing the value of C in the expression $f_b=MC/I$, wherein M is equal to the bending moment, C is the distance from the neutral axis to the point of stress, and $f_b$ is the bending stress, said angular contortion further reducing the effective thickness of the delineator cross-section, along with the value of I, and decreasing the bending radius R in accordance with the expression $R=EI/M$, thereby increasing the flexibility of the delineator in impact, said angular contortion being developed by (i) greater stiffness of the ribs compared to the greater flexibility of the thinner web between said ribs and (ii) higher value of C where the bending stress is measured at the ribs, in view of protrusion of the ribs forward of the planar web surface.*

*40. A delineator as defined in claim 38, wherein the reversible change in the value of I results from the combined rib structure and thinner, planar web which are further adapted to deform upon impact by lateral angular contortion of the rib structure about the longitudinal axis of the delineator toward its neutral axis in a rearward direction, decreasing the effective thickness of the delineator cross-section, decreasing the value of I, and developing a reduced bending radius defined by the expression $R=EI/M$, said angular contortion being developed by (i) greater stiffness of the ribs compared to the greater flexibility of the thinner web between said ribs and (ii) higher value of C where the bending stress is measured at the ribs, in view of protrusion of the ribs forward of the planar web surface.*

*41. A delineator as defined in claim 32 wherein the delineator further comprises an additional protruding rib located on an opposing side of the web structure from the planar surface adapted to face the oncoming traffic and extending rearward of the delineator, said rearward rib being formed integrally with the web structure and being limited to slight protrusion therefrom to avoid excessive stress which would otherwise result in longitudinal shearing and destructive deformation during dynamic bending of the delineator, said slightly protruding rib providing additional thickness to the web structure, thereby increasing the value of I;*

*said rearward rib structure further including longitudinal reinforcing fibers to provide increased value of elastic modulus for withstanding a greater driving load at the top of said delineator.*

*42. A delineator as defined in claim 41 wherein the rearward rib is centrally located at the rearward side of the web structure.*

*43. A delineator as defined in claim 41 wherein EI of the rib structure during dynamic bending requires the delineator to deform in accordance with a radius of curvature (R) defined by the relationship $R=EI/M$ wherein M is the bending moment applied to the delineator during impact by the vehicle.*

*44. A delineator as defined in claim 41, wherein the opposing side of the web structure comprises a second planar surface from which the rearward rib protrudes.*

*45. A delineator as defined in claim 44 wherein the rearward rib is centrally located at the rearward side of the web structure.*

*46. A delineator as defined in claim 44, wherein the reversible change in the value of I results from the combined rib structure and thinner, planar web which are further adapted to deform upon impact by lateral angular contortion of the rib structure about the longitudinal axis of the delineator toward its neutral axis in a rearward direction, decreasing the effective thickness of the delineator cross-section, decreasing the value of I, and developing a reduced bending radius defined by the expression $R=EI/M$, said angular contortion being developed by (i) greater stiffness of the ribs compared to the greater flexibility of the thinner web between said ribs and (ii) higher value of C where the bending stress is measured at the ribs, in view of protrusion of the ribs from the planar web surfaces.*

* * * * *

UNITED STATES PATENT AND TRADEMARK OFFICE

CERTIFICATE OF CORRECTION

PATENT NO. : Re. 32,045

DATED : December 10, 1985

INVENTOR(S) : Donald W. Schmanski

It is certified that error appears in the above-identified patent and that said Letters Patent are hereby corrected as shown below:

In the claims: Cancel Claim 20.

Signed and Sealed this

Sixth Day of September, 1988

*Attest:*

DONALD J. QUIGG

*Attesting Officer*

*Commissioner of Patents and Trademarks*